(12) United States Patent
Ikegaya et al.

(10) Patent No.: US 8,972,989 B2
(45) Date of Patent: *Mar. 3, 2015

(54) COMPUTER SYSTEM HAVING A VIRTUALIZATION MECHANISM THAT EXECUTES A JUDGMENT UPON RECEIVING A REQUEST FOR ACTIVATION OF A VIRTUAL COMPUTER

(75) Inventors: Naoko Ikegaya, Sagamihara (JP); Tomoki Sekiguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,469

(22) Filed: Aug. 8, 2012

(65) Prior Publication Data

US 2012/0324450 A1    Dec. 20, 2012

Related U.S. Application Data

(63) Continuation of application No. 12/482,496, filed on Jun. 11, 2009, now Pat. No. 8,271,977.

(30) Foreign Application Priority Data

Jul. 30, 2008    (JP) .................................. 2008-195930

(51) Int. Cl.
*G06F 9/455*    (2006.01)
*G06F 12/00*    (2006.01)
(Continued)

(52) U.S. Cl.
CPC .............. *G06F 9/455* (2013.01); *G06F 9/4401* (2013.01); *H04L 12/12* (2013.01); *H04L 12/40032* (2013.01); *H04L 12/40039* (2013.01); *Y02B 60/34* (2013.01)
USPC ................ 718/1; 710/240; 713/320; 709/223

(58) Field of Classification Search
None
See application file for complete search history.

(56) References Cited

U.S. PATENT DOCUMENTS 6,421,782 B1    7/2002    Yanagisawa et al.
7,206,832 B2    4/2007    Matsunami et al.
(Continued)

FOREIGN PATENT DOCUMENTS

EP    0 977 112 A2    2/2000
JP    04-084335    3/1992
(Continued)

OTHER PUBLICATIONS

JP Office Action in JP App. No. 2012-048161, dated Jul. 23, 2013.
(Continued)

*Primary Examiner* — Mengyao Zhe
*Assistant Examiner* — Bing Zhao
(74) *Attorney, Agent, or Firm* — Mattingly & Malur, PC

(57) ABSTRACT

A virtualization mechanism in a first computer of the plurality of computers generates at least one virtual computer on the first computer. The virtualization mechanism in the first computer executes at least one of a first judgment and a second judgment when a request for activating a first virtual computer of the at least one virtual computer is received, the first judgment being for judging whether or not the activation of the first virtual computer is prohibited based on first information stored in a memory of the virtualization mechanism, and the second judgment being for judging whether or not an identifier included in a logic I/O adapter device assigned to the first virtual computer is invalid based on second information stored in the memory of the virtualization mechanism. The activation of the first virtual computer is permitted or prohibited based on the executed judgment.

18 Claims, 11 Drawing Sheets

| LPAR INFORMATION | VIRTUALIZATION MECHANISM IDENTIFICATION INFORMATION | LPAR INFORMATION FOR MAC ELEMENT | DEFINITION CHANGE | ACTIVATION SUPPRESSION | ACTIVATION STATE |
|---|---|---|---|---|---|
| 1 | SYSTEM REGISTRATION INFORMATION | OWN LPAR INFORMATION | PROHIBIT | on | STOP |
| 2 | ANOTHER SYSTEM REGISTRATION INFORMATION | L3 | NO LIMIT | off | STOP |
| 3 | SYSTEM REGISTRATION INFORMATION | OWN LPAR INFORMATION | PROHIBIT | off | ACTIVATE |

700

710   720   730   740   750   760

(51) Int. Cl.
*G06F 1/26* (2006.01)
*G06F 15/173* (2006.01)
*G06F 9/44* (2006.01)
*H04L 12/12* (2006.01)
*H04L 12/40* (2006.01)

(56) References Cited

U.S. PATENT DOCUMENTS

| | | | |
|---|---|---|---|
| 7,269,631 B2 * | 9/2007 | Reuter et al. | 709/216 |
| 7,321,927 B2 | 1/2008 | Nakajima et al. | |
| 7,814,363 B2 | 10/2010 | Hatta et al. | |
| 8,458,695 B2 * | 6/2013 | Fitzgerald et al. | 718/1 |
| 2004/0059901 A1 | 3/2004 | Miller et al. | |
| 2005/0055589 A1 | 3/2005 | Kojo | |
| 2005/0154928 A1 | 7/2005 | Larson et al. | |
| 2005/0210304 A1 | 9/2005 | Hartung et al. | |
| 2006/0136704 A1 | 6/2006 | Arendt et al. | |
| 2006/0174087 A1 | 8/2006 | Hashimoto et al. | |
| 2006/0195617 A1 | 8/2006 | Arndt et al. | |
| 2008/0028053 A1 | 1/2008 | Kelley et al. | |
| 2008/0104424 A1 | 5/2008 | Jennings | |
| 2009/0077370 A1 | 3/2009 | Barabash et al. | |

FOREIGN PATENT DOCUMENTS

| | | |
|---|---|---|
| JP | 08-305596 | 11/1996 |
| JP | 10240547 | 9/1998 |
| JP | 2005202652 | 7/2005 |
| JP | 2007-164305 A | 6/2007 |
| WO | 2008/117472 A1 | 10/2008 |

OTHER PUBLICATIONS

JP Office Action in JP Application No. 2012-048161, dated Jan. 28, 2014.

* cited by examiner

FIG.6

| SLOT INFORMATION | PORT NUMBER | COMMON NUMBER | WWN | ASSIGNMENT SITUATION |
|---|---|---|---|---|
| S0 | P0 | VFC1 | | |
| S0 | P0 | VFC2 | | |
| S0 | P0 | VFC3 | | |
| S0 | P0 | VFC4 | | |
| S0 | P1 | VFC1 | | |
| S0 | P1 | VFC2 | | |
| S0 | P1 | VFC3 | | |
| S0 | P1 | VFC4 | | |
| S1 | P0 | VFC1 | | |
| S1 | P0 | VFC2 | | |
| S1 | P0 | VFC3 | | |
| S1 | P0 | VFC4 | | |
| S1 | P1 | VFC1 | | |
| S1 | P1 | VFC2 | | |
| S1 | P1 | VFC3 | | |
| S1 | P1 | VFC4 | | |

| LPAR INFORMATION | SLOT | PORT | MANAGEMENT NUMBER | DEVICE TYPE | ADAPTER TYPE |
|---|---|---|---|---|---|
| L1 | S1 | Pa | VNIC0 | NIC | |
| L1 | S1 | Pb | VNIC1 | NIC | |
| L1 | S2 | Pa | VNIC2 | NIC | |
| L1 | S2 | Pb | VNIC3 | NIC | |
| L1 | S0 | P0 | VFC1 | HBA | |
| L1 | S0 | P1 | VFC1 | HBA | |
| L2 | S1 | Pa | VNIC0 | NIC | |
| L2 | S1 | Pb | VNIC1 | NIC | |
| L2 | S0 | P0 | VFC2 | HBA | |
| L2 | S0 | P1 | VFC2 | HBA | |
| L3 | S2 | Pa | VNIC0 | NIC | |
| L3 | S2 | Pb | VNIC1 | NIC | |
| L3 | S0 | P0 | VFC3 | HBA | |
| L3 | S0 | P1 | VFC3 | HBA | |

| LPAR INFORMATION | VIRTUALIZATION MECHANISM IDENTIFICATION INFORMATION | LPAR INFORMATION FOR MAC ELEMENT | DEFINITION CHANGE | ACTIVATION SUPPRESSION | ACTIVATION STATE |
|---|---|---|---|---|---|
| 1 | SYSTEM REGISTRATION INFORMATION | OWN LPAR INFORMATION | PROHIBIT | on | STOP |
| 2 | ANOTHER SYSTEM REGISTRATION INFORMATION | L3 | NO LIMIT | off | STOP |
| 3 | SYSTEM REGISTRATION INFORMATION | OWN LPAR INFORMATION | PROHIBIT | off | ACTIVATE |

710  720  730  740  750  760

COMPUTER SYSTEM HAVING A VIRTUALIZATION MECHANISM THAT EXECUTES A JUDGMENT UPON RECEIVING A REQUEST FOR ACTIVATION OF A VIRTUAL COMPUTER

CROSS-REFERENCES

This application is a continuation application of U.S. Ser. No. 12/482,496, filed Jun. 11, 2009, the entire contents of which are hereby incorporated by reference. This application claims priority to JP 2008-195930, filed Jul. 30, 2009.

BACKGROUND OF THE INVENTION

This invention relates to a method of managing the activation or booting of a computer system and a virtual computer system, or in particular, to a technique for suppressing the activation of the computer.

The virtualization technique for concentrating a plurality of jobs on a single computer improves the utilization efficiency of the hardware resources such as the processor, the memory and the input and output units on the one hand and can change the resource assignment in accordance with the processing amount on the other hand.

A configuration in which a plurality of computers are activated by reading the operating system (OS) from the same storage volume, on the other hand, can change the computer for executing a job. The configuration of a storage unit that can be shared by a plurality of computers is called a storage area network (SAN), in which the storage unit and the computers are connected through a fiber channel switch or a storage switch.

In the storage unit that can be shared, the storage volume can be accessed or updated from all the computers connected, and therefore, the problem of security has been posed. To overcome this problem, the storage unit sets a specified computer in correspondence with the storage volume in the storage unit using a world wide name (WWN) as unique device identification information stored in a host bus adapter (HBA) making up an I/O adapter of the fiber channel (FC) held by the computer.

This function of setting in correspondence is called a host group, and by use of the host group, the right of access to the storage volume is granted only to a computer having the HBA with the WWN thereof registered in the storage volume.

In the case where a plurality of computers are prepared to execute a job, either the WWN of the computer executing the job is registered anew in the host group each time the computer is switched, or the WWNs of the plurality of the computers are registered in the host group beforehand. The WWN is registered anew each time of switching the computer at the sacrifice of a bothersome operation.

The advance registration of the WWNs of a plurality of computers in the host group, on the other hand, makes it possible for the plurality of the computers to access the same storage volume, and therefore, fails to solve the security problem.

In view of this, U.S. Pat. No. 7,321,927 discloses a management server which simplifies the operation by eliminating the need of changing the setting in the host group. According to this method, the WWN is transferred to that of the new computer to which the computer executing the job is changed. A plurality of WWNs assignable to a plurality of computers and the storage area identification information are stored in correspondence with each other in the management server in advance, and a WWN and the corresponding storage area identification information are sent from the management server to the computer executing the job. The computer executing the job sets the WWN and is booted from the area indicated by the storage area identification information.

In the case where these computers are virtual computers, a virtualization mechanism defines a virtual I/O adapter to store unique virtual device identification information. U.S. Published Application No. 2006/0195617 discloses a system in which the unique virtual device identification information is set in the I/O adapter of the virtual computer using the technique by which a plurality of device identification information can be registered in the I/O adapter of a computer. With this system, the WWN registered in the host group of the storage unit can be rendered to coincide with the WWN of the virtual I/O adapter of the virtual computer, and therefore, only a specified virtual computer can access the storage volume.

Conventionally, in the case where the computer executing the job is switched from a virtual computer to a (physical) computer or to a virtual computer on a different computer, the registration change or the multiple registration in the host group is avoided by transferring the device identification information set in the I/O adapter to that of the computer to which the computer executing the job is switched.

In this system, assume that it becomes impossible to use the management server, the operation is interfered with by other than the management server, or an application occurs in which the same device identification information would be originally set in a plurality of computers. In such a case, a plurality of computers may come to have the same device identification information.

Once a plurality of computers having the same device identification information are activated, the problem is posed that the access control mechanism of the storage unit fails to work effectively, with the result that a plurality of computers can undesirably access the same storage volume. Also, in the case where the I/O adapter is a network interface, a communication error may be caused if a plurality of computers have the same network device identification information such as a MAC address.

SUMMARY OF THE INVENTION

Accordingly, it is an object of this invention to provide a computer activation management method in which even in the case where a virtual computer or a computer with the device identification information changeable to switch the job-execution computer is triggered at a timing not intended by the user, the computer can be controlled not to be activated.

The above and other objects, features and advantages will be made apparent by the detailed description taken in conjunction with the accompanying drawings.

A typical computer system disclosed by this invention is briefly described below.

Specifically, a typical computer system according to the invention includes an I/O adapter for storing information indicating whether setting the activation of the computer is valid or invalid, and an activation management unit for preventing the computer from being switched on in the case where information contained in the computer switch-on command received is judged as invalid based on the information stored in the I/O adapter.

Also, a computer system according to the invention comprises a virtualization mechanism including a device identification management table for storing a logic I/O adapter and device identification information assignable to a virtual computer in correspondence with each other, and a virtual computer activation unit for checking the device identification information corresponding to the logic I/O adapter assigned to the virtual computer based on the device identification management table and suppressing the activation of the virtual computer in the case where the device identification information has a value indicating the activation suppression.

According to a first aspect of the invention, there is provided a computer activation management method for a computer system comprising a plurality of computers for executing a program and a storage system connected to the computers through a network, wherein the computers each include an I/O adapter connected to the network and an activation management unit for controlling the power on/off of the computers, wherein the I/O adapter stores information as to whether setting the activation of each computer is valid or invalid, and wherein the activation management unit, upon reception of a switch-on command for the computer, prevents the computer from being switched on in the case where the information contained in the command is judged as invalid based on the information stored in the I/O adapter.

According to a second aspect of the invention, there is provided a virtual computer activation management method for a virtual computer system comprising a plurality of computers for executing a program, a storage system connected to the computers through a network and a virtualization mechanism built in each computer to generate a virtual computer on the computer, wherein the virtualization mechanism stores the correspondence between the logic I/O adapter and device identification information assignable to the virtual computer, checks the device identification information corresponding to the logic I/O adapter assigned to the virtual computer at the time of activating the virtual computer, and suppresses the activation of the virtual computer in the case where the device identification information has a value indicative of the activation suppression.

BRIEF DESCRIPTION OF THE DRAWINGS

FIG. 6 is a diagram showing the detail of the WWN management table used in the virtual computer system according to the second embodiment of the invention.

FIG. 7 is a diagram showing the detail of the device management table used in the virtual computer system according to the second embodiment of the invention.

FIG. 8 is a diagram showing the detail of the LPAR management table used in the virtual computer system according to the second embodiment of the invention.

DETAILED DESCRIPTION OF THE INVENTION

Figure 1:
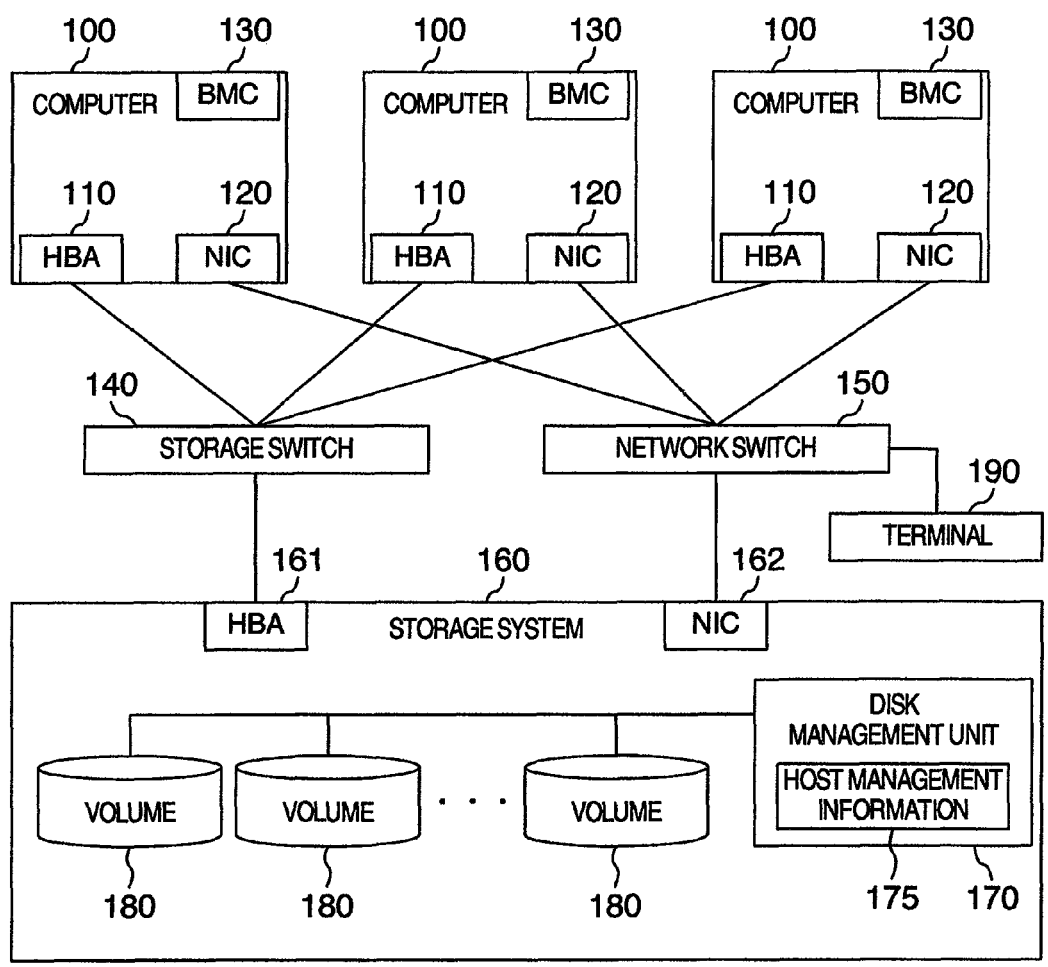
FIG. 1 is a diagram showing the configuration of the computer system according to a first embodiment of the invention.

The advantage of a typical embodiment of the invention disclosed by the present application is briefly explained below.

Specifically, the advantage of a typical embodiment of the invention is that the virtual computer or the computer can be controlled not to be activated even in the case where the computer is triggered at a timing not intended by the user.

Embodiments of the invention are described in detail below with reference to the drawings. Incidentally, in all the drawings for explaining the embodiments, the same component members are basically designated by the same reference numerals, respectively, and not described repeatedly.

First Embodiment

With reference to FIG. 1, the configuration of the computer system according to a first embodiment of the invention is explained. FIG. 1 is a diagram showing the configuration of the computer system according to the first embodiment of the invention.

In FIG. 1, the computer system is configured of a plurality of computers 100, a storage system 160, a storage switch 140 for connecting the plurality of computers 100 and the storage system 160 and a network switch 150. Also, the network switch 150 is connected with a terminal 190 for various settings.

The plurality of the computers 100 are each connected to the storage switch 140 through a host bus adapter (HBA) 110 of the fiber channel, and also to the network switch 150 through a network interface card (NIC) 120.

Also, the storage switch 140 and the network switch 150 are connected to the storage system 160 through an HBA 161 and a NIC 162, respectively, and thus permit access from the plurality of the computers 100.

Each computer 100 has built therein a BMC (baseboard management controller) 130 and, therefore, the power supply of the hardware can be controlled through the network.

A disk management unit 170 in the storage system 160 has the function of setting the host group to limit the computers 100 accessible to disk volumes 180. The disk management unit 170 also relates the HBA 110 mounted on each computer 100 to the disk volumes 180, and stores the relation as host management information 175. The host management information 175 is set from the terminal 190.

The computers 100 can also use the blades of a blade system. One of the blades may be assigned to the terminal 190. Also, the plurality of the computers 100 may be installed at mutually distant places.

Figure 2:
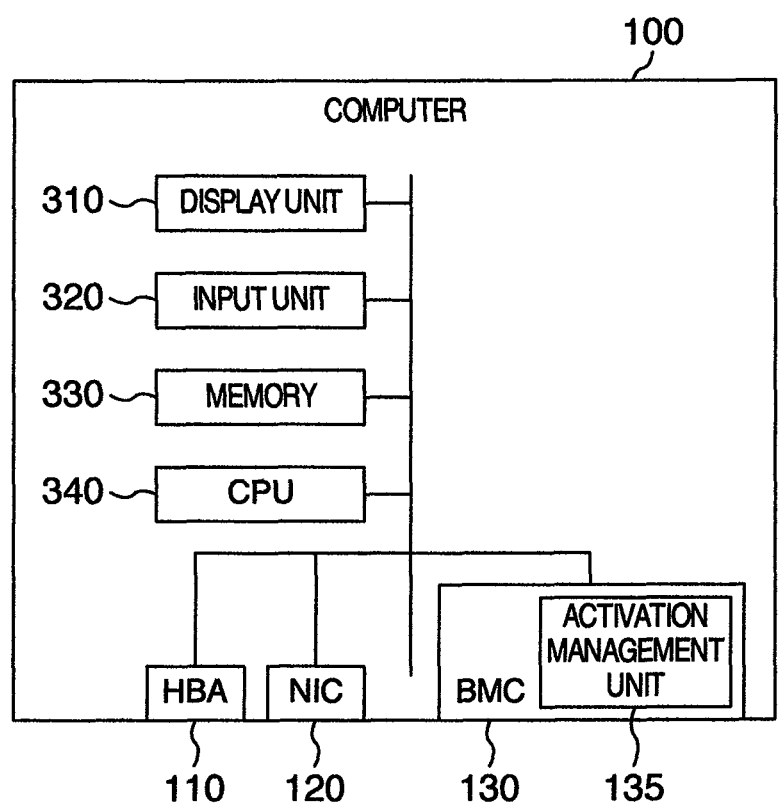
FIG. 2 is a diagram showing the detailed configuration of each of the computers of the computer system according to the first embodiment of the invention.

Next, the detailed configuration of each of the computers included in the computer system according to the first embodiment is explained with reference to FIG. 2. FIG. 2 is a diagram showing a detailed configuration of each computer of the computer system according to the first embodiment of the invention.

The computer 100 is configured of a display unit 310 for displaying the computer status and a program execution result, an input unit 320 for supplying data to the program, a memory 330 for holding the job processing program and the data, a CPU 340 for executing the program, an HBA 110, a NIC 120 and a BMC 130.

The HBA 110 holds a unique identifier called WWN required to specify to the other party of the fiber channel communication. The BMC 130, on the other hand, mainly monitors and controls the hardware of the computer 100. The BMC 130 has an activation management unit 135 and can switch on/off the power of the computer 100 at the request of the terminal 190.

Figure 3:
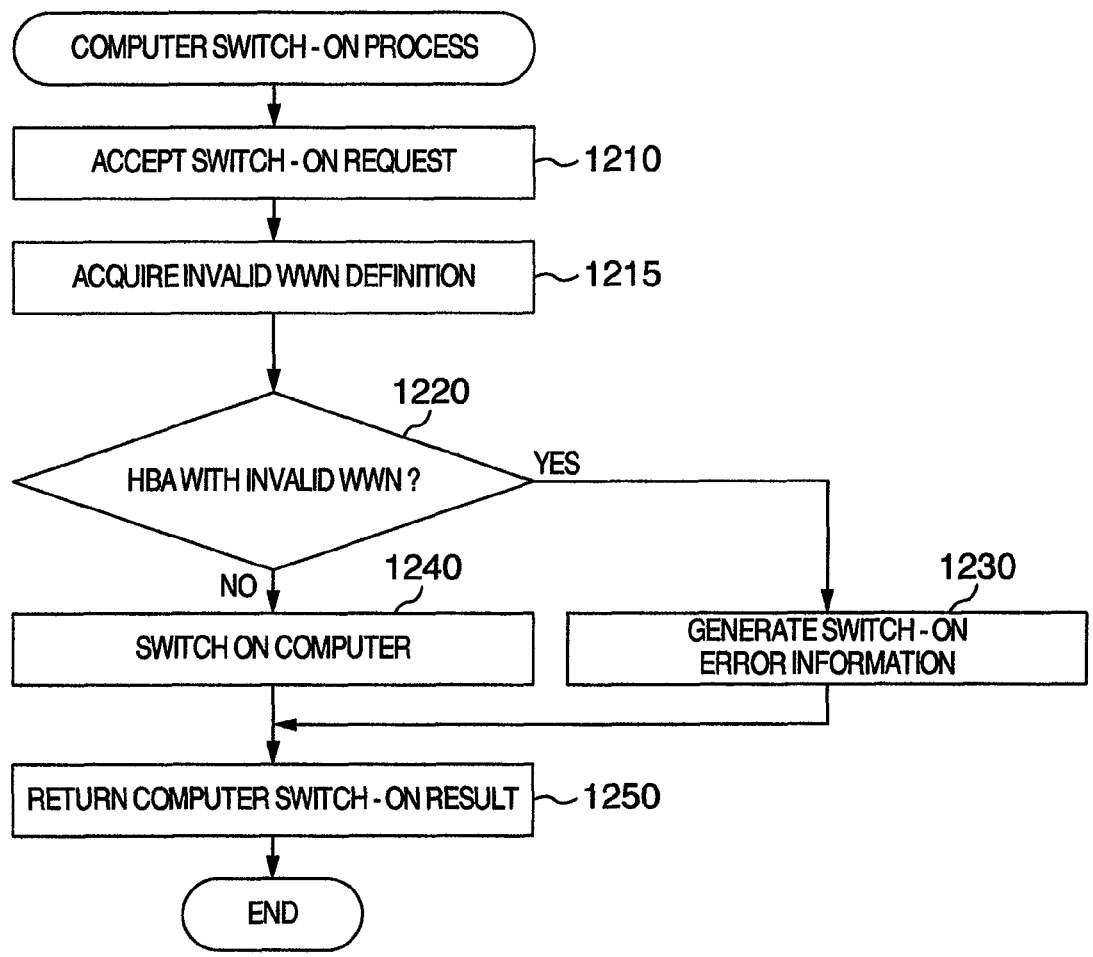
FIG. 3 is a flowchart showing the operation of each activation management unit of the computer system according to the first embodiment of the invention.

Next, the operation of the activation management unit of the computer system according to the first embodiment of the invention is explained with reference to FIG. 3. FIG. 3 is a flowchart showing the operation of the activation management unit of the computer system according to the first embodiment of the invention.

The computer 100 is activated by the activation management unit 135 of the BMC 130.

First, in step 1210, the request to switch on the power of the computer 100 is accepted. Incidentally, the BMC 135 can be activated with another power supply before activating the computer 100.

Then, the definition information for an invalid WWN is acquired in step 1215.

The definition information of an invalid WWN acquired in step 1215 is, for example, a value set beforehand in the activation management unit 135 in response to an external command or by an external operation, a value stored in the BMC 130 and changeable later through the interface, or a value not held in the BMC 130 but input from an external computer at the time of executing the process of step 1215.

Next, the process proceeds to step 1220, in which the WWN of the HBA 110 is read and checked as to whether it coincides with the definition information of an invalid WWN acquired in step 1215.

When step 1220 judges that an invalid WWN is registered, step 1230 generates error information indicating that the computer 100 cannot be activated by switching on power.

Upon judgment in step 1220 that an invalid WWN is not registered, on the other hand, the computer 100 is switched on and activated in step 1240.

Finally, in step 1250, the processing result such as information indicating the successful computer activation or the error information prohibiting the switch-on power is output to the source of activation.

As described above, according to this embodiment, the activation, if requested, of the computer 100 can be suppressed by the BMC 130. Even in the case where the same I/O adapter identifier is set on different computers 100, the registration of an invalid WWN in at least one HBA 110 can suppress the activation of the computer having the particular HBA 110.

As described above, according to this embodiment, assume that the same I/O adapter identifier is set on different computers or the LPARs of different computers. Even in that case, by registering an invalid WWN on at least one HBA 110, the activation of the computer having the particular HBA 110 is suppressed.

This process makes it possible to control the computer not to be activated even in the case where the computer activation is triggered at a timing not intended by the user.

Second Embodiment

The second embodiment represents a virtual computer system equivalent to the first embodiment in which the computer 100 further includes a virtualization mechanism and which is operated with the LPAR under the control of the virtualization mechanism to perform the computer activation management.

Figure 4:
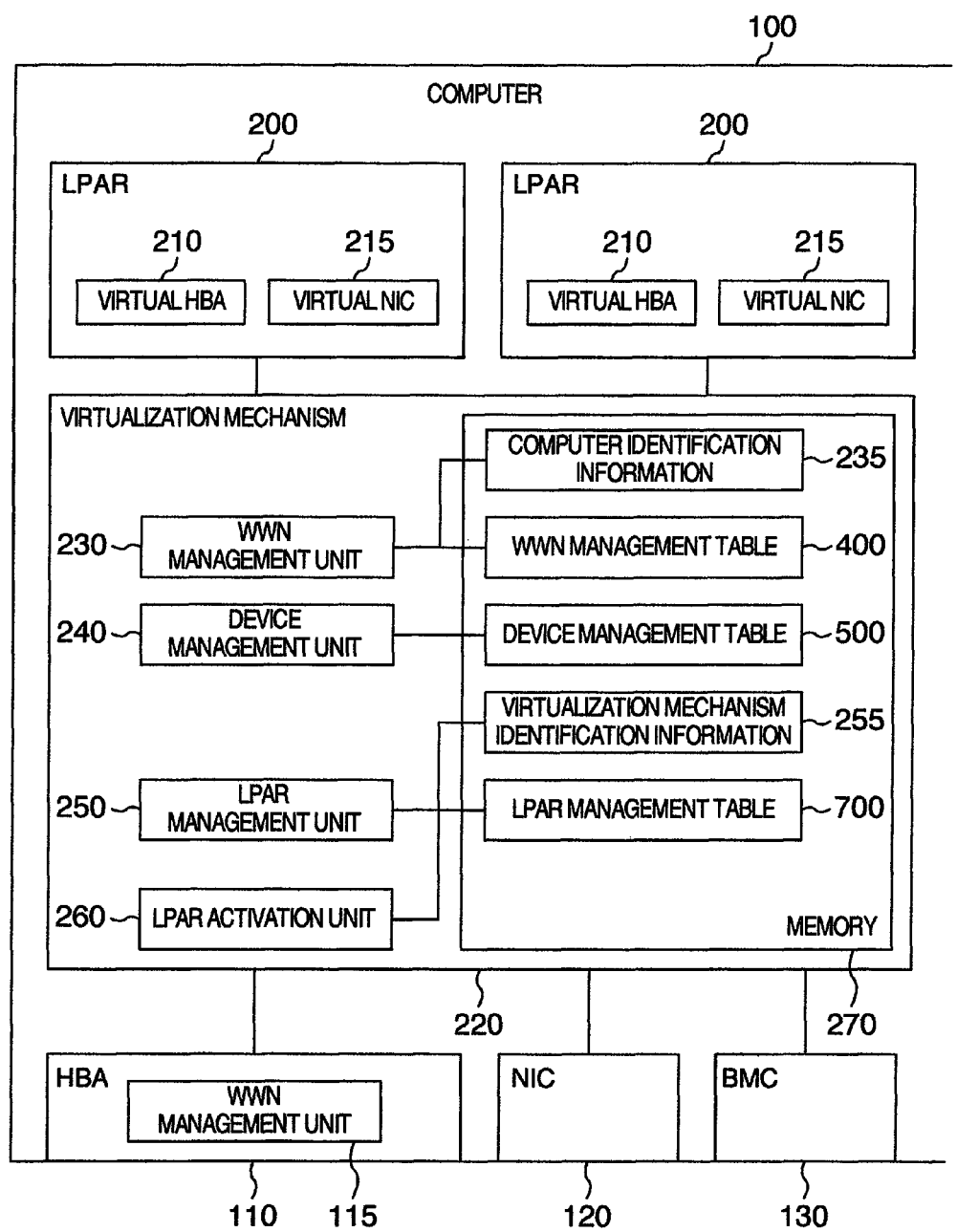
FIG. 4 is a diagram showing the configuration of a computer of the virtual computer system according to a second embodiment of the invention.

With reference to FIG. 4, the configuration of each computer of the virtual computer system according to the second embodiment of the invention is explained. FIG. 4 is a diagram showing the configuration of each computer of the virtual computer system according to the second embodiment of the invention, which is similar to the configuration of the computer system according to the first embodiment shown in FIG. 1.

In FIG. 4, the computer 100, as compared with the computer 100 shown in FIG. 2, includes a virtualization mechanism 220 in addition to an HBA 110, a NIC 120, a BMC 130, and a display unit 310, an input unit 320, a memory 330 and a CPU 340 not shown. In the virtualization mechanism 220, the CPU 340 and the memory 330 of one physical computer are divided and assigned to the LPARs (logical partitions) 200. The LPARs 200 make up a virtual computer.

As a result, the single computer 100 presents the appearance of a plurality of logic computers LPAR 200. Each LPAR 200, like the computer 100, includes a virtual HBA 210 and a virtual NIC 215. A unique WWN is assigned to the port of the virtual HBA 210.

Also, a WWN management unit 115 of the HBA 110 of the computer 100 has a plurality of port identification information (N port IDs), and the WWN of each virtual HBA 210 can be registered in the virtual port of the HBA 110.

The virtualization mechanism 220 includes a WWN management unit 230, a device management unit 240, an LPAR management unit 250, an LPAR activation unit 260 and a memory 270.

The memory 270 stores the computer identification information 235, a WWN management table 400 making up a device identification management table, a device management table 500, virtualization mechanism identification information 255 and an LPAR management table 700. The virtualization mechanism 220, to which the operation request is input from the terminal 190, operates the LPAR 200 using the data stored in the memory 270 and outputs the operation result to the terminal 190.

Figure 5:
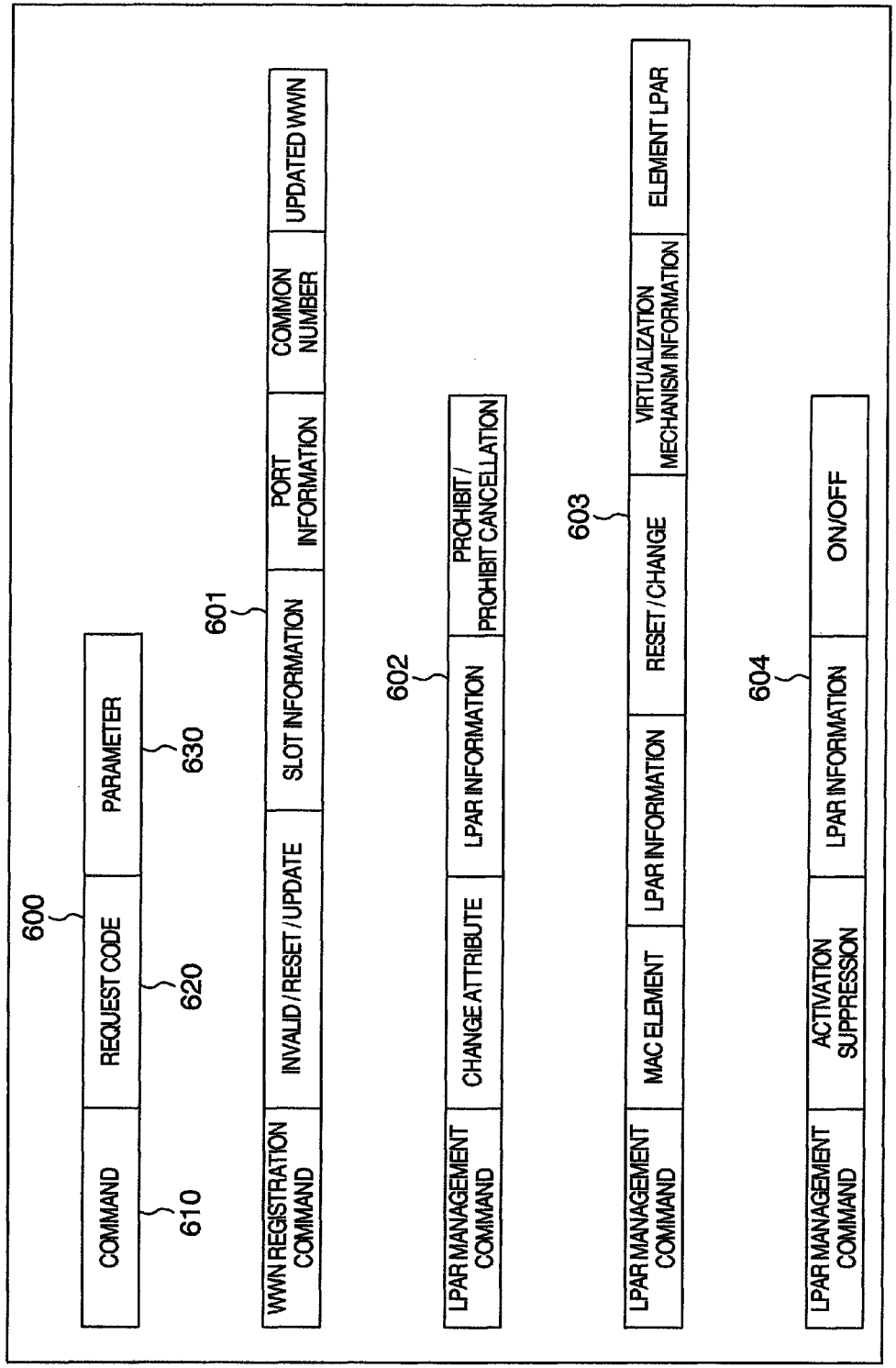
FIG. 5 is a diagram showing the format of the commands used in the virtual computer system according to the second embodiment of the invention.

Next, the commands and the tables used in the virtual computer system according to the second embodiment of the invention are explained with reference to FIGS. 5 to 8. FIGS. 5 to 8 are diagrams showing the commands and the tables used in the virtual computer system according to the second embodiment of the invention. FIG. 5 is a diagram showing the command formats, FIG. 6 a diagram showing the detail of the WWN management table, FIG. 7 a diagram showing the detail of the device management table, and FIG. 8 a diagram showing the detail of the LPAR management table.

In FIG. 5, the command 600 input to the virtualization mechanism 220 has a format including a command 610, a request code 620 indicating the detailed request content of the command, and a parameter 630 required for the command. Two or more parameters 630 may be included depending on the command 610 and the request code 620.

As shown in FIG. 5, for example, the command 610 includes a WWN registration command 601 and LPAR management commands 602 to 604. The request code 620, on the other hand, includes an invalid/reset/update code, a change attribute, a MAC element and the activation suppression. The information following the request code makes up the parameter 630.

In FIG. 6, the WWN management table 400 stores a list of the virtual HBAs 210 assignable to the LPARs 200.

A column 410 designates the slot information indicating the mounting position of the HBA 110. In the case where the computer is a blade, the slot mounting sequence information for each blade may be used as the slot information.

The column 420 designates the port information held by each HBA 110. The column 430 designates a common number whereby one port is shared by a plurality of LPARs 200. In the case of FIG. 6, the HBA 110 can hold VFC1 to VFC4, and therefore, four LPARs 200 can share each port.

The column 440 designates the WWN assigned to the virtual HBA 210 indicated by the columns 410, 420 and 430. Once the WWN of the column 440 is changed, the virtual HBA 210 of the LPAR 200 to which the particular port is assigned uses the WWN after the change. The column 450 stores the LPAR information of the LPAR 200 with the port of the virtual HBA 210 assigned to the LPAR 200.

In FIG. 7, the device management table 500 stores the information on the I/O adapter including the virtual HBA 210 and the virtual NIC 215 assigned to the LPAR 200.

The column 510 designates the identification information of the LPAR 200. The column 520 designates the slot information of the I/O adapter used by the LPAR 200. The column 530 designates the port information of the I/O adapter used by the LPAR.

The column 540 designates the management number. In the case where the I/O adapter is the virtual NIC (VNIC) 215, the management number is a unique VNIC number in the LPAR 200. In the case where the I/O adapter is the virtual HBA 210, on the other hand, the management number is a common number used in the WWN management table 400.

The column 550 designates the information indicating whether the I/O adapter is the virtual NIC 215 or the virtual HBA 210. In the device management table 500, the row can be added at the time of assigning the I/O adapter to the LPAR 200, or the row can be deleted or the contents of registration changed at the time of canceling the assignment of the I/O adapter. The column 560 designates the adapter type.

Once the virtual HBA 210 is assigned to the LPAR 200, the identification information of the LPAR 200 is stored in the column 450 of the WWN management table 400. In the case where the assignment is canceled, on the other hand, the information stored in the column 450 is deleted.

The job processing program executed by the LPAR 200 uses the WWN as the identification information of the virtual HBA 210. The WWN thus used is designated in the column 440 in the row corresponding to the virtual HBA 210 assigned to the LPAR 200 in the WWN management table 400. In the case where the virtualization mechanisms 220 of different computers 100 register the same WWN in the column 440 of the WN management table, respectively, LPARs 200 of the same WWN configuration can be constructed. Between the LPARs 200 of this same WWN configuration, the job processing program can be relocated without changing the host group setting of the storage system 160.

In FIG. 8, the LPAR management table 700 stores the LPAR operation and the definition generated at the time of initial activation of the virtualization mechanism 220 and required for managing each LPAR.

The column 710 designates information for identifying the LPAR 200. The columns 720 and 730 store information used to generate the MAC address for identifying the virtual NIC 215. Specifically, the column 720 stores information as to whether the value of the virtualization mechanism identification information 255 is used or not, or if not used, what value is used to generate the unique MAC address in the computer system.

Similarly, the column 730 stores information as to whether the identification information of the LPAR 200 including the virtual NIC 215 is used or not, or if not used, what value is used as an element to generate the MAC address. The column 740 stores information as to whether the change in the definition information of the LPAR 200 is prohibited or not. An example of the definition information of the LPAR is the information on the I/O adapter assigned to the LPAR managed in the table 500.

The column 750 designates information as to whether the LPAR 200 can be activated or not. Even in the case where an activation request is input to the LPAR with the activation suppression in the on state, the virtualization mechanism 220 controls the particular LPAR not to be activated. The column 760, on the other hand, designates information as to whether the LPAR 200 is in activation or not.

Figure 9:
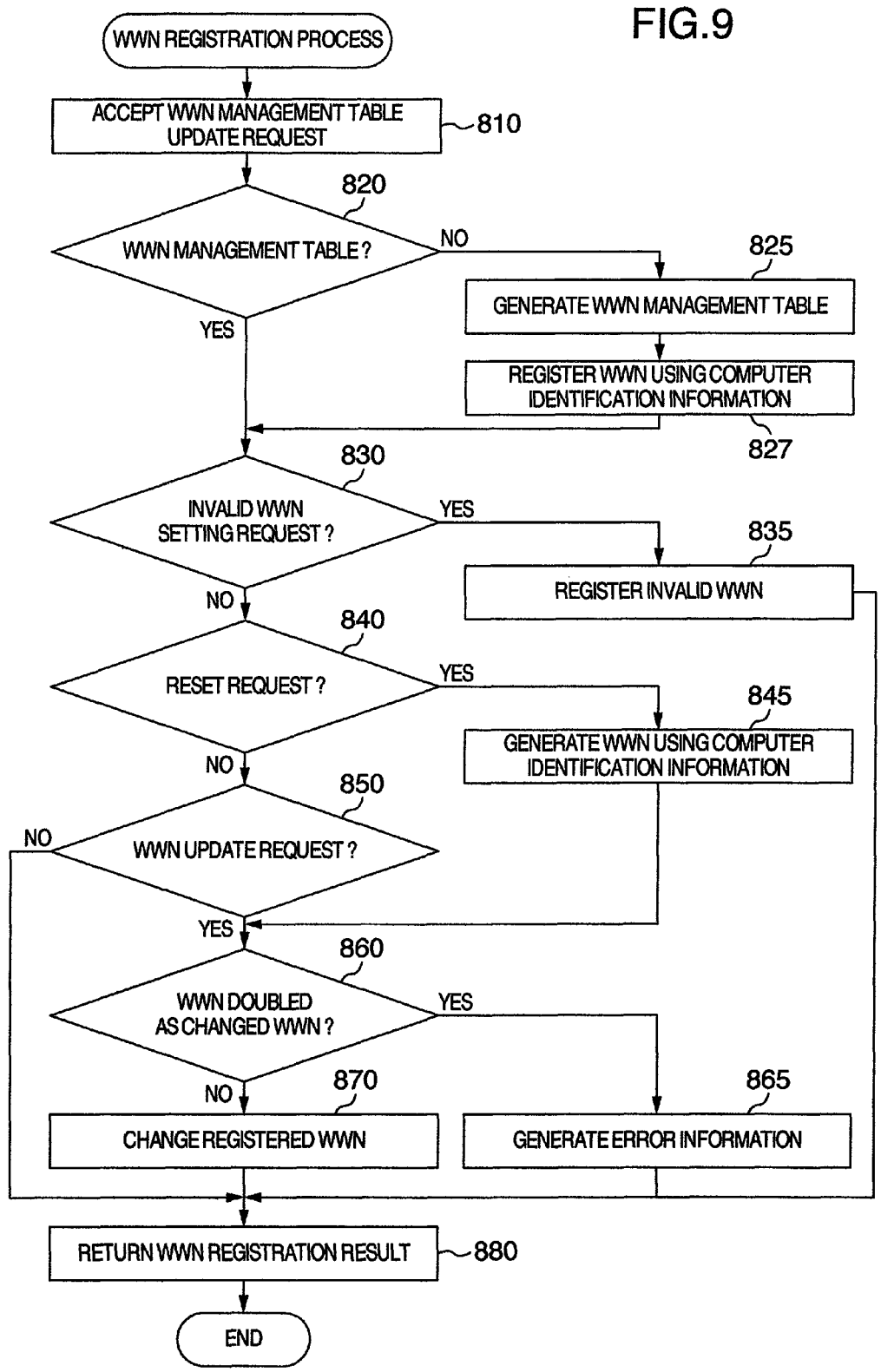
FIG. 9 is a diagram showing the process executed in the WWN management unit of the computers of the virtual computer system according to the second embodiment of the invention.

Next, the process executed by the WWN management unit of the computers of the virtual computer system according to the second embodiment of the invention is explained. FIG. 9 is a flowchart showing the process executed by the WWN management unit of the computers of the virtual computer system according to the second embodiment of the invention. This flowchart shows the process of registering a list of the WWNs of the virtual HBA 210 managed by the virtualization mechanism 220.

First, step 810 accepts a request for updating the WWN management table 400. The request thus accepted is a WWN registration command in the form designated by numeral 601 in FIG. 5. The request code 620 is indicative of an invalid WWN registration, the restoration of WWN to the initial value or a change in WWN. The parameter 630 includes the slot number, the port number and the common number. In the case where the request code indicates a change in WWN, the WWN value after change is received also with the parameter 630.

Then, step 820 checks whether the WWN management table 400 is stored in the memory 270 or not. Upon judgment in step 820 that the WWN management table 400 is not so stored, step 825 secures an area for the WWN management table 400 in the memory 270, and based on the number of HBAs 110 mounted, generates the rows in the number equal to the total number of sets of the slot number, the port number and the common number. Also, step 827 stores the initial WWN value in the column 440 on each row.

The initial WWN value is, for example, a unique value of 64 bits generated using the slot number, the port number, the common number and the computer identification information 235. The computer identification information 235 can be the identifier of the blade with the computer 100 mounted thereon and the identifier of the chassis accommodating the blade.

Upon judgment in step 820 that the WWN management table 400 is stored in the memory 270, on the other hand, step 830 judges whether the request code 620 indicates an invalid WWN setting request. Upon judgment in step 830 that the request code 620 is indicative of an invalid WWN setting, step 835 stores the invalid WWN information in the column 440 in the row that can be specified from the parameter 630 indicating the slot number, the port number and the common number in the WWN management table 400. Then, the process proceeds to step 880.

The invalid WWN information is, for example, the 64-bit information such as the hexadecimal value 2000000000000000 defined in advance by the virtualization mechanism 220.

In the case where the judgment in step 830 is NO, the process proceeds to step 840. Step 840 judges whether the request code 620 indicates the reset request to restore the WWN to the initial value, and upon judgment in step 840 that the request code 620 indicates the reset request, step 845 generates the initial WWN value from the computer identification information 235 and the value of the parameter 630 indicating the slot number, the port number and the common number.

In the case where the judgment in step 840 is NO, step 850 judges whether the request code 620 is indicative of the WWN update request or not. Upon judgment in step 850 that the request code 620 is indicative of the WWN update request, the process proceeds to step 860, while in the case where the judgment in step 850 is NO, on the other hand, the process proceeds to step 880.

Step 860 judges whether the initial WWN value generated in step 845 or the changed WWN received with the parameter 630 is registered on other than the corresponding row in the WWN management table 400 or not. Upon judgment in step 860 that a WWN already registered exists, step 865 generates the error information indicating that the changed WWN doubles with the existing WWN. Upon judgment in step 860 that there is no WWN registered, on the other hand, step 870 changes the column 440 on the corresponding row to the initial WWN value or the changed WWN received with the parameter 630.

Finally, step 880 sends to the requester the processing result indicating the failure of registration in the WWN management table 400, the WWN information before or after the change or no registration.

Incidentally, before changing the WWN in step 870, the column 740 of the LPAR management table 700 may be checked and in the case where the WWN is associated with the virtual HBA 210 of the LPAR with the definition change prohibition registered, the change of the WWN may be prohibited.

As described above, the WWN used by the virtual HBA 210 can be changed in the virtualization mechanism 220. When changed to the WWN thus far used in the LPAR 200 of a different computer 100, therefore, the disk volume 180 thus far used in the LPAR 200 of the different computer 100 can be accessed from the LPAR 200 with the changed WWN without changing the host management information 175.

Figure 10:
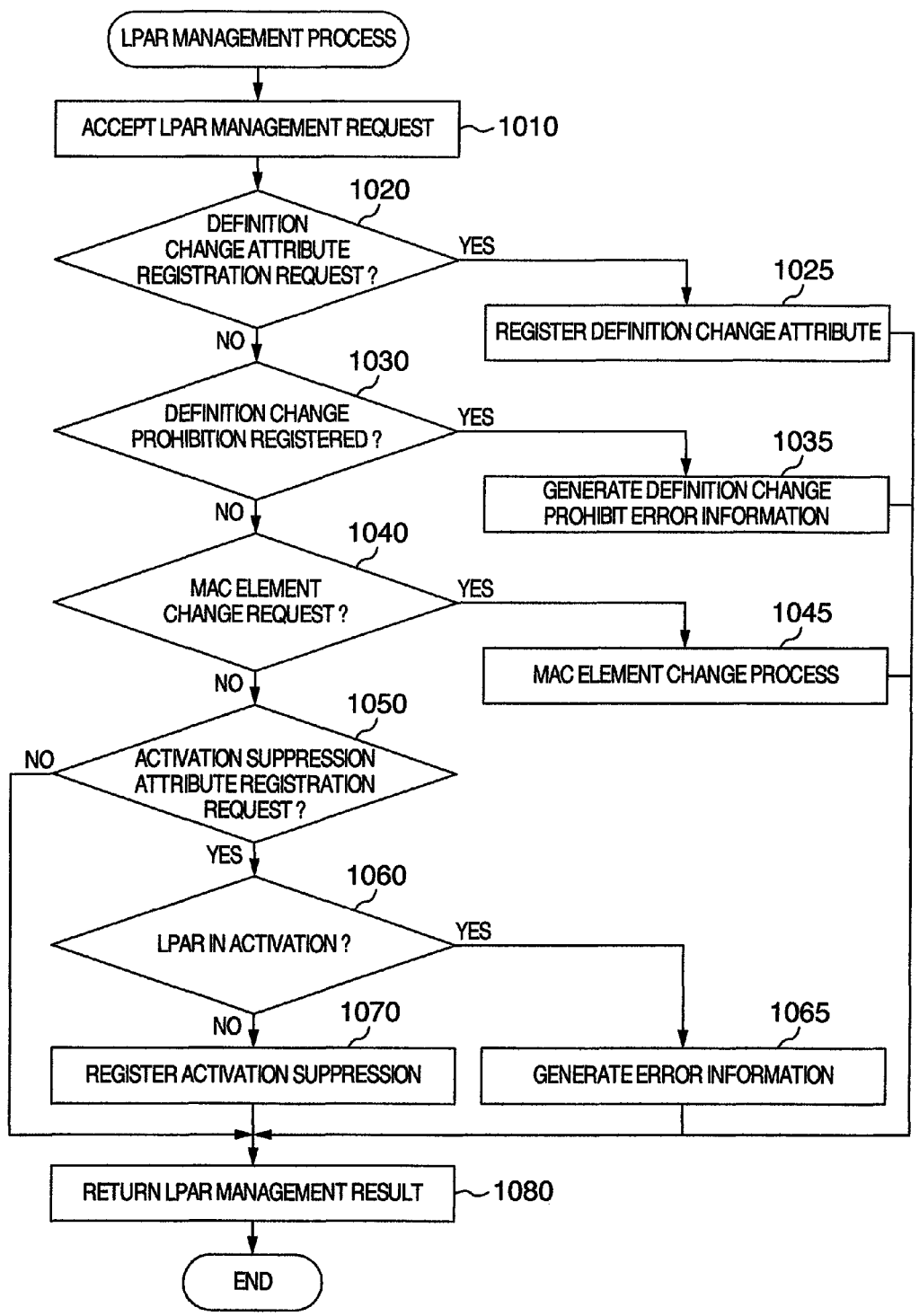
FIG. 10 is a flowchart showing the process executed in the LPAR management unit of the computers of the virtual computer system according to the second embodiment of the invention.
Figure 11:
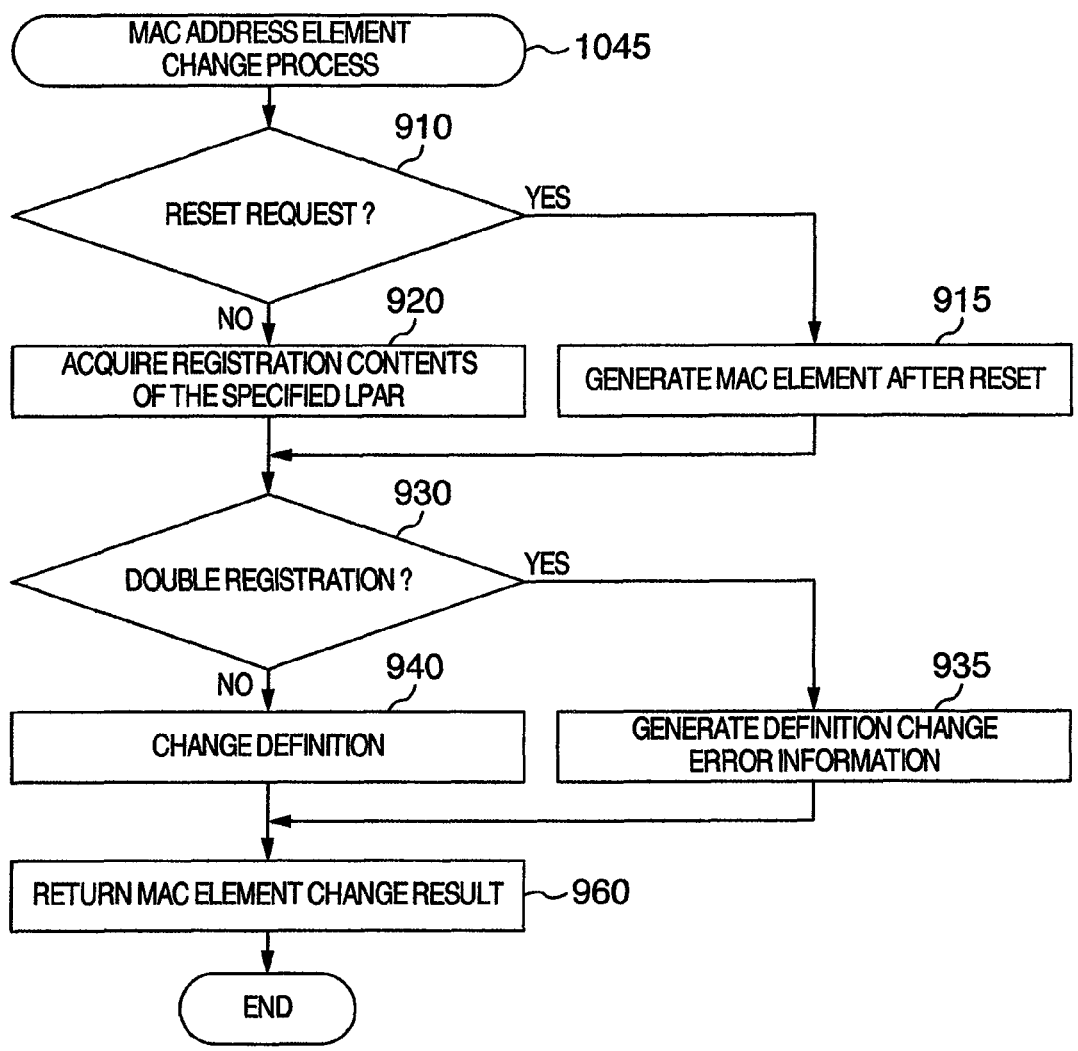
FIG. 11 is a flowchart showing the MAC element changing process for the computers of the virtual computer system according to the second embodiment of the invention.

Next, the process executed in the LPAR management unit of the computers of the virtual computer system according to the second embodiment of the invention is explained with reference to FIGS. 10 and 11. FIG. 10 is a flowchart showing the process executed in the LPAR management unit of the computers of the virtual computer system according to the second embodiment of the invention, and FIG. 11 a flowchart showing the detailed process of changing the MAC element of the computers of the virtual computer system according to the second embodiment of the invention.

First, step 1010 accepts the update request for the LPAR management table 700. The request thus accepted is the LPAR management command in a form designated by numeral 602, 603 or 604 in FIG. 5.

In the case where the request code 620 represents a request to change the definition change attribute, the form 602 is used and the parameter 630 assumes a value indicating the LPAR information and whether the definition change is prohibited or the prohibition thereof is canceled. In the case where the request code 620 represents a request to change the MAC element, on the other hand, the form 603 is used and the parameter 630 assumes a value indicating the LPAR information and whether the MAC element is reset to the initial value or changed, and if changed, a value including two values, i.e., a value used as the information on the virtualization mechanism and a value of the LPAR information used as the MAC element. In the case where the request code 620 represents a request to set the activation suppression of the LPAR, the form 604 is used and the parameter assumes a value indicating the LPAR information and whether the activation suppression is turned on or off.

Then, step 1020 judges whether the request code 620 is indicative of a request to register the definition change attribute or not. Upon judgment in step 1020 that the request code 620 is indicative of the request to register the definition change attribute, step 1025 stores the information on the prohibition or the prohibition cancellation of the parameter 630 in the column 740 in the row corresponding to the LPAR information of the parameter 630, and the process proceeds to step 1080.

Upon judgment in step 1020 that the request code 620 is not indicative of a request to register the definition change attribute, step 1030 judges whether the definition change prohibition in the column 740 in the row corresponding to the LPAR information of the parameter 630 is registered or not. Upon judgment in step 1030 that the value indicating the change prohibition is stored, step 1035 generates the definition change prohibition error information indicating the command execution result of the definition change prohibited, and the process proceeds to step 1080.

Upon judgment in step 1030 that the definition change is possible, the process proceeds to step 1040 to judge whether the request code 620 is indicative of the MAC element change request or not. Upon judgment in step 1080 that the request code 620 is indicative of the MAC element change request, the process proceeds to step 1045.

Now, the process of step 1045 is described in detail with reference to the flowchart of FIG. 11.

First, in the MAC address element change process of step 1045, step 910 judges whether the parameter 630 contains a value indicative of resetting the MAC address generation element, and upon judgment in step 910 that the parameter 630 contains a value indicative of resetting the MAC address generation element, step 915 provisionally generates the MAC element after resetting. This MAC element is the value stored in the columns 720 and 730 at the time of generating the LPAR management table 700 initially, and includes both a value indicating the use of the value of the virtualization mechanism identification information 255 and a value indicated by the LPAR information designated by the parameter 630.

Upon judgment in step 910 that the parameter 630 contains a value indicative of not resetting but changing the MAC address generation element, on the other hand, the process proceeds to step 920 to acquire the values of the columns 720 and 730 corresponding to the LPAR information designated by the parameter 630.

Next, step 930 judges whether the MAC element after resetting or the value of the element LPAR and the virtualization mechanism identification information delivered with the parameter 630 is already stored in another LPAR not in the row of the particular element LPAR.

Upon judgment in step 930 that the value of the element LPAR is already registered, step 935 generates the error information that the MAC element after change doubles as another LPAR, and the process proceeds to step 960.

Upon judgment in step 930 that the value of the element LPAR is not registered, on the other hand, step 940 changes the columns 720 and 730 in the particular row to a designated value, and the process proceeds to step 960.

Finally, step 960 sends, to step 1080 in FIG. 10, the error information or the information indicating that the MAC element is successfully registered.

In the case where step 1040 judges that the request code 620 is not indicative of the MAC element change request, on the other hand, the process proceeds to step 1050. Step 1050 judges whether the request code 620 is indicative of the request to register the LPAR activation suppression attribute or not. Upon judgment in step 1050 that the request code 620 is indicative of the request to register the LPAR activation suppression attribute, the process proceeds to step 1060. Upon judgment in step 1050 that the request code 620 is not indicative of the request to register the LPAR activation suppression attribute, on the other hand, the process proceeds to step 1080.

Step 1060 judges whether the column 760 in the row corresponding to the LPAR information delivered with the parameter 630 assumes a value indicating the in-activation state. Upon judgment in step 1060 that the particular column assume a value indicating the in-activation state, step 1065 generates change error information due to the in-activation state of the LPAR.

In the case where step 1060 judges that LPAR is not in activation, on the other hand, the process proceeds to step 1070, and the on or off state of the activation suppression attribute delivered with the parameter 630 is registered in the column 750.

Finally, the information indicating the successful registration in the LPAR management table 700 or the error information is output to the command requester in step 1080.

The job processing program executed by the LPAR 200 may use a virtual MAC address as the identification information of the virtual NIC 215. The virtual mechanism 220 can change the MAC element used to generate the value of the MAC address used by the virtual NIC 215.

Once the MAC element is changed to the one thus far used by the LPAR 200 of a different computer 100, network communication similar to the LPAR 200 of the different computer 100 becomes possible. Specifically, the job processing program can be relocated between the LPARs 200 without changing the communication setting of the job processing program or the device management table 500.

Figure 12:
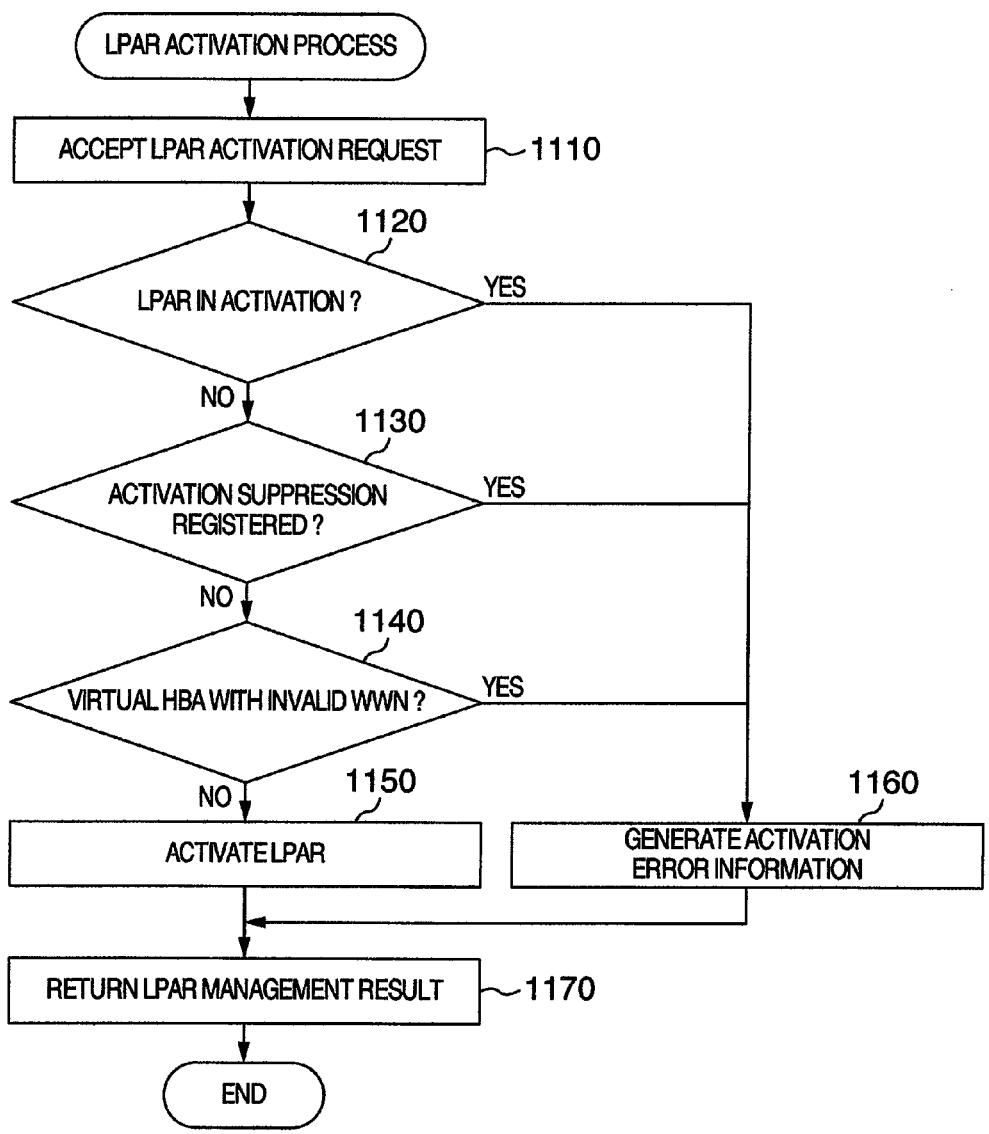
FIG. 12 is a flowchart showing the process executed in the LPAR activation unit of the computers of the virtual computer system according to the second embodiment of the invention.

Next, the process executed by the LPAR activation unit of the computers of the virtual computer system according to the second embodiment of the invention is explained with reference to FIG. 12. FIG. 12 is a flowchart showing the process executed by the LPAR activation unit of the computers of the virtual computer system according to the second embodiment of the invention.

First, the LPAR activation request is accepted in step 1110.

Then, step 1120 judges from the LPAR management table 700 whether the column 760 in the row corresponding to the LPAR of which the activation is requested assumes a value indicating the in-activation state. Upon judgment in step 1120 that the LPAR is not in activation, the process proceeds to step 1130, while upon judgment in step 1120 that the LPAR is in activation, on the other hand, the process proceeds to step 1160.

Step 1130 judges from the LPAR management table 700 whether the column 750 in the row corresponding to the LPAR of which the activation is requested assumes the on-state value indicating that the activation of the LPAR is suppressed.

Upon judgment in step 1130 that the column 750 is not in the on state, the process proceeds to step 1140, while upon judgment in step 1130 that the column is in the on state, on the other hand, the process proceeds to step 1160.

Step 1140 judges whether an LPAR is assigned the virtual HBA 210 with an invalid WWN registered therein. This judgment is made by determining, using the WWN management table 400, whether the value stored in the column 440 coincides with an invalid WWN for all the rows for which the identifier of the LPAR to be activated is registered in the column 450.

Upon judgment in step 1140 that an invalid WWN is registered, step 1160 generates the error information that the LPAR cannot be activated.

Upon judgment in step 1140 that an invalid WWN is not registered, on the other hand, the LPAR is activated in step 1150. In the process, the value indicating that the LPAR is in activation is registered in the column 760 in the row of the corresponding LPAR of the LPAR management table 700. Further, the information for identifying the I/O adapter is stored in the column 560 of the device management table 500.

In the case where the device type of the column 550 is NIC, a MAC address generated by combining the MAC elements of the columns 720, 730 of the LPAR management table 700 with the value of the column 540 of the device management table 500 is used as the identification information. In the case where the device type of the column 550 is HBA, on the other hand, the WWN stored in the column 440 of the WWN management table 400 is used.

Finally, in step 1170, the processing result such as the information indicating that the LPAR is successfully activated or the error information that the LPAR has failed to be activated is output to the requester.

As described above, according to this embodiment, the virtualization mechanism 220 can prepare an LPAR of which the activation is suppressed against an activation request. Even in the case where the same I/O adapter identifier is set on the LPARs of different computers, therefore, the simultaneous activation of the plurality of these LPARs which otherwise might be caused by a careless LPAR operation can be suppressed.

By executing the process as described above, the virtual computer, if triggered at a timing not intended by the user, can be controlled not to be activated.

The embodiments of the invention achieved by the present inventor are specifically described above. Nevertheless, this invention is not limited to such embodiments, and can of course be variously modified without departing from the spirit of the invention.

The present invention relating to the computer activation management method for the computer system and the virtual computer system is widely applicable to systems for controlling by suppression of the activation of a computer and a virtual computer.

The invention claimed is:

1. A first computer in a virtual computer system comprising a plurality of computers for executing a program and a storage system connected to the computers via a network, the first computer comprising:

a virtualization mechanism which generates a first virtual computer and a second virtual computer to each of which a physical CPU and a physical memory of the first computer are divided and assigned, the first virtual computer and the second virtual computer accessing a plurality of storage volumes on the storage system, wherein a first management table is stored in a memory of the virtualization mechanism, the management table indicates a first correspondence between the first virtual computer and whether activation of the first virtual computer is permitted or prohibited and a second correspondence between the second virtual computer and whether activation of the second virtual computer is permitted or prohibited, where the first correspondence and the second correspondence are updated independently of each other, wherein a second management table is stored in the memory of the virtualization mechanism, the second management table indicates a third correspondence between an identifier and a logic I/O adapter assigned to the first virtual computer, wherein when a request for activating the first virtual computer is received, the virtualization mechanism in the first computer executes a first judgment in which:

the virtualization mechanism judges whether or not the activation of the first virtual computer is prohibited based on the first management table and if, in accordance with the first judgment, the activation is not prohibited, the virtualization mechanism executes a second judgment of checking the identifier corresponding to the logic I/O adapter assigned to the first virtual computer based on the second management table when the first virtual computer is to be activated, and prohibits the activation of the first virtual computer when the identifier is registered as an invalid identifier, and if, in accordance with the second judgment, the activation is not prohibited, activates the first virtual computer.

2. The first computer according to claim 1,
wherein the virtualization mechanism includes a virtual computer activation unit for executing the first judgment.

3. The first computer according to claim 1,
wherein a world wide name (WWN), which is registered in correspondence with the logic I/O adapter, is used as the identifier.

4. The first computer according to claim 1,
wherein, in the first judgment, if the first virtual computer is prohibited then the first virtual computer is not activated, and if the activation of the first virtual computer is not prohibited then the second judgment is executed; and
wherein, in the second judgment, if the identifier included in the logic I/O adapter to which the first virtual computer is assigned is invalid then the first virtual computer is not activated, and if the identifier included in the logic I/O adapter to which the first virtual computer is assigned is valid, then the first virtual computer is activated.

5. The first computer according to claim 1,
wherein the logic I/O adapter is a virtual HBA or a virtual NIC; and
wherein the identifier in correspondence with the logic I/O adapter is a world wide name (WWN).

6. The first computer according to claim 1,
wherein the virtualization mechanism generates additional virtual computers.

7. A virtualization mechanism in a first computer in a virtual computer system comprising a plurality of computers for executing a program and a storage system connected to the computers via a network, the virtualization mechanism configured to:

generate a first virtual computer and a second virtual computer to each of which a physical CPU and a physical memory of the first computer are divided and assigned, the first virtual computer and the second virtual computer accessing a plurality of storage volumes on the storage system, store a first management table in a memory thereof which indicates a first correspondence between the first virtual computer and whether activation of the first virtual computer is permitted or prohibited and a second correspondence between the second virtual computer and whether activation of the second virtual computer is permitted or prohibited, where the first correspondence and the second correspondence are updated independently of each other, store a second management table in the memory which indicates a third correspondence between an identifier and a logic I/O adapter assigned to the first virtual computer, and when a request for activating the first virtual computer is received, execute a first judgment of:

checking whether or not the activation of the first virtual computer is prohibited based on the first management table and if, in accordance with the first judgment, the activation is not prohibited, execute a second judgment of:

checking the identifier corresponding to the logic I/O adapter assigned to the first virtual computer based on the second management table when the first virtual computer is to be activated, and prohibiting the activation of the first virtual computer when the identifier is registered as an invalid identifier, and if, in accordance with the second judgment, the activation is not prohibited, activate the first virtual computer.

8. The virtualization mechanism according to claim 7, further comprising:
a virtual computer activation unit for executing the first judgment.

9. The virtualization mechanism according to claim 7,
wherein a world wide name (WWN), which is registered in correspondence with the logic I/O adapter, is used as the identifier.

10. The virtualization mechanism according to claim 7,
wherein, in the first judgment, if the first virtual computer is prohibited then the first virtual computer is not activated, and if the activation of the first virtual computer is not prohibited then the second judgment is executed; and
wherein, in the second judgment, if the identifier included in the logic I/O adapter to which the first virtual computer is assigned is invalid then the first virtual computer is not activated, and if the identifier included in the logic I/O adapter to which the first virtual computer is assigned is valid, then the first virtual computer is activated.

11. The virtualization mechanism according to claim 7,
wherein the logic I/O adapter is a virtual HBA or a virtual NIC; and
wherein the identifier in correspondence with the logic I/O adapter is a world wide name (WWN).

12. The virtualization mechanism according to claim 7,
wherein the virtualization mechanism generates additional virtual computers.

13. A method of activating a virtual computer in a virtual computer system comprising a plurality of computers for executing a program and a storage system connected to the computers via a network, the method of activating a virtual computer comprising the steps of:

generating, with a virtualization mechanism, a first virtual computer and a second virtual computer to each of which a physical CPU and a physical memory of the first computer are divided and assigned, the first virtual computer and the second virtual computer accessing a plurality of storage volumes on the storage system;

storing, in a memory of the virtualization mechanism, a management table indicating a first correspondence between the first virtual computer and whether activation of the first virtual computer is permitted or prohibited and a second correspondence between the second virtual computer and whether activation of the second virtual computer is permitted or prohibited, where the first correspondence and the second correspondence are updated independently of each other;

storing a second management table in the memory of the virtualization mechanism, the second management table indicating a third correspondence between an identifier and a logic I/O adapter assigned to the first virtual computer; and upon receiving a request for activating the first virtual computer, executing, by the virtualization mechanism in the first computer, a first judgment in which:

the virtualization mechanism checks whether or not the activation of the first virtual computer is prohibited based on the first management table and if, in accordance with the first judgment, the activation is not prohibited, executing a second judgment in which:

the virtualization mechanism checks the identifier corresponding to the logic I/O adapter assigned to the first virtual computer based on the second management table when the first virtual computer is to be activated, and prohibits the activation of the first virtual computer when the identifier is registered as an invalid identifier, and if, in accordance with the second judgment, the activation is not prohibited, activating the first virtual computer.

14. The method of activating a virtual computer according to claim 13,
wherein the virtualization mechanism includes a virtual computer activation unit for executing the first judgment.

15. The method of activating a virtual computer according to claim 13,
wherein a world wide name (WWN), which is registered in correspondence with the logic I/O adapter, is used as the identifier.

16. The method of activating a virtual computer according to claim 13,
wherein, in the first judgment, if the first virtual computer is prohibited then the first virtual computer is not activated, and if the activation of the first virtual computer is not prohibited then the second judgment is executed; and
wherein, in the second judgment, if the identifier included in the logic I/O adapter to which the first virtual computer is assigned is invalid then the first virtual computer is not activated, and if the identifier included in the logic I/O adapter to which the first virtual computer is assigned is valid, then the first virtual computer is activated.

17. The method of activating a virtual computer according to claim 13,
wherein the logic I/O adapter is a virtual HBA or a virtual NIC; and
wherein the identifier in correspondence with the logic I/O adapter is a world wide name (WWN).

18. The method of activating a virtual computer according to claim 13, further comprising:
generating, with the virtualization mechanism, additional virtual computers.

\* \* \* \* \*